US012791406B2

(12) United States Patent
Hu et al.

(10) Patent No.: US 12,791,406 B2
(45) Date of Patent: Nov. 10, 2026

(54) FORCE SENSOR

(71) Applicant: Measurement Specialties (China) Ltd., Shenzhen City (CN)

(72) Inventors: Qineng Hu, North Shenzhen (CN); Ching Fung (Patricia) Chui, North Shenzhen (CN)

(73) Assignee: Measurement Specialties (China) Ltd., Shenzhen City (CN)

( * ) Notice: Subject to any disclaimer, the term of this patent is extended or adjusted under 35 U.S.C. 154(b) by 523 days.

(21) Appl. No.: 18/312,707

(22) Filed: May 5, 2023

(65) Prior Publication Data

US 2023/0358622 A1 Nov. 9, 2023

(30) Foreign Application Priority Data

May 6, 2022 (CN) ........................ 202210485748.X

(51) Int. Cl.
*G01L 1/22* (2006.01)

(52) U.S. Cl.
CPC .......... *G01L 1/2262* (2013.01); *G01L 1/2237* (2013.01); *G01L 1/2287* (2013.01)

(58) Field of Classification Search
CPC ... G01L 1/2262; G01L 1/2237; G01L 1/2287; G01L 1/2281; G01L 1/26; G01L 1/18
See application file for complete search history.

(56) References Cited

U.S. PATENT DOCUMENTS

| | | | | |
|---|---|---|---|---|
| 4,993,266 A * | 2/1991 | Omura | G01L 1/18 | 73/754 |
| 7,458,281 B2 * | 12/2008 | Ohsato | G01L 5/162 | 73/862.041 |
| 7,637,174 B2 * | 12/2009 | Hirabayashi | G01L 1/26 | 73/862.041 |
| 7,757,571 B2 * | 7/2010 | Hirabayashi | G01L 1/26 | 73/862.626 |
| 7,938,028 B2 * | 5/2011 | Hirabayashi | G01L 5/162 | 73/862.626 |
| 8,113,065 B2 * | 2/2012 | Ohsato | G01L 1/18 | 29/610.1 |
| 8,276,466 B2 * | 10/2012 | Kurtz | G01L 5/0009 | 73/862.041 |
| 8,350,345 B2 * | 1/2013 | Vaganov | G06F 3/0338 | 257/419 |
| 8,733,182 B2 * | 5/2014 | Huizinga | G01L 1/2231 | 73/862.045 |
| 9,171,965 B2 * | 10/2015 | Takenaka | H10D 62/8303 | |
| 9,565,886 B2 * | 2/2017 | Bird | A42B 3/063 | |

(Continued)

*Primary Examiner* — Freddie Kirkland, III
(74) *Attorney, Agent, or Firm* — Barley Snyder

(57) ABSTRACT

A force sensor includes a force-sensing elastomer, a thermal conductivity component adapted to transfer an external load to the force-sensitive elastomer, a plurality of strain gauges attached to the force-sensitive elastomer, and a circuit board. The circuit board electrically connects the plurality of strain gauges to a detection circuit adapted to detect a strain of the force-sensitive elastomer. A peripheral part of the force-sensitive elastomer is in contact with the thermal conductivity component, and a remaining part of the force-sensitive elastomer is separated from the thermal conductivity component. The plurality of strain gauges are attached to the remaining part of the force-sensitive elastomer and do not contact the thermal conductivity component.

21 Claims, 5 Drawing Sheets

(56) References Cited

U.S. PATENT DOCUMENTS

| | | | | |
|---|---|---|---|---|
| 9,719,464 | B2 * | 8/2017 | Klinner | F16J 15/123 |
| 10,041,845 | B2 * | 8/2018 | Petersen | G01L 5/22 |
| 10,054,504 | B2 * | 8/2018 | Gouko | G01L 1/18 |
| 11,680,860 | B2 * | 6/2023 | Pounds | B64U 30/20<br>73/862.043 |
| 11,747,223 | B2 * | 9/2023 | Yamaguchi | G01L 1/2206<br>73/862.627 |
| 11,835,403 | B2 * | 12/2023 | Suganumata | G01L 5/226 |
| 2006/0086190 | A1 * | 4/2006 | Ohsato | G01L 5/162<br>73/764 |
| 2010/0000327 | A1 * | 1/2010 | Morimoto | G01L 5/162<br>73/760 |
| 2013/0247657 | A1 * | 9/2013 | Sumitani | G01M 17/02<br>73/146 |
| 2017/0356818 | A1 * | 12/2017 | Gouko | G01L 1/18 |
| 2021/0223120 | A1 * | 7/2021 | Fortgens | G01L 1/2237 |
| 2021/0387352 | A1 * | 12/2021 | Lipsey | B25J 13/085 |
| 2024/0238985 | A1 * | 7/2024 | Fortin | G01L 5/1627 |

* cited by examiner

FORCE SENSOR

CROSS-REFERENCE TO RELATED APPLICATION

This application claims the benefit of Chinese Patent Application No. CN202210485748.X filed on May 6, 2022, in the State Intellectual Property Office of China, the whole disclosure of which is incorporated herein by reference.

FIELD OF THE INVENTION

The present disclosure relates to a force sensor for detecting force.

BACKGROUND

A typical force sensor may include a strain gauge and a force-sensitive diaphragm utilizing a semiconductor piezoresistive effect or metal strain effect for determining force. The strain gauge may be mounted on the force-sensitive diaphragm, and the external load applied on the force-sensitive diaphragm is detected by sensing the strain of the force-sensitive diaphragm. These sensors, however, are subject to error due to, for example, heat conduction within the thin-walled diaphragm structure.

Specifically, for strain gauges based on semiconductor piezo resistance effect or metal strain effect, changes in temperature will cause the resistance of the strain gauge to change, resulting in false or inaccurate strain measurements. For a detection circuit that includes a Wheatstone bridge, if a resistance of the four strain gauges increases or decreases at the same time, a detection error caused by temperature change can be eliminated due to the self-compensation effect of the Wheatstone bridge. However, if the temperature of the four strain gauges is different at a given time, the resistance will be unbalanced, which will reduce the detection accuracy of the force sensor.

For example, in one application, when a heat generating component contacts a middle part of the force-sensitive diaphragm, the heat will be transferred to the middle part of the force-sensitive diaphragm first, and then distributed to the surrounding areas of the force-sensitive diaphragm. This causes the resistance of the strain gauge near the center of the force-sensitive diaphragm to change faster than the resistance near the edge of the force-sensitive diaphragm. This leads to the imbalance of the resistance of multiple strain gauges and significantly reduces the detection accuracy of the force sensor.

SUMMARY

A force sensor according to an embodiment of the present disclosure includes a force-sensing elastomer, a thermal conductivity component adapted to transfer an external load to the force-sensitive elastomer, a plurality of strain gauges attached to the force-sensitive elastomer, and a circuit board. The circuit board electrically connects the plurality of strain gauges to a detection circuit adapted to detect a strain placed on the force-sensitive elastomer. A peripheral part of the force-sensitive elastomer is in contact with the thermal conductivity component, and a remaining part of the force-sensitive elastomer is separated from the thermal conductivity component. The plurality of strain gauges are attached on the remaining part of the force-sensitive elastomer and do not contact the thermal conductivity component.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Figure 1:
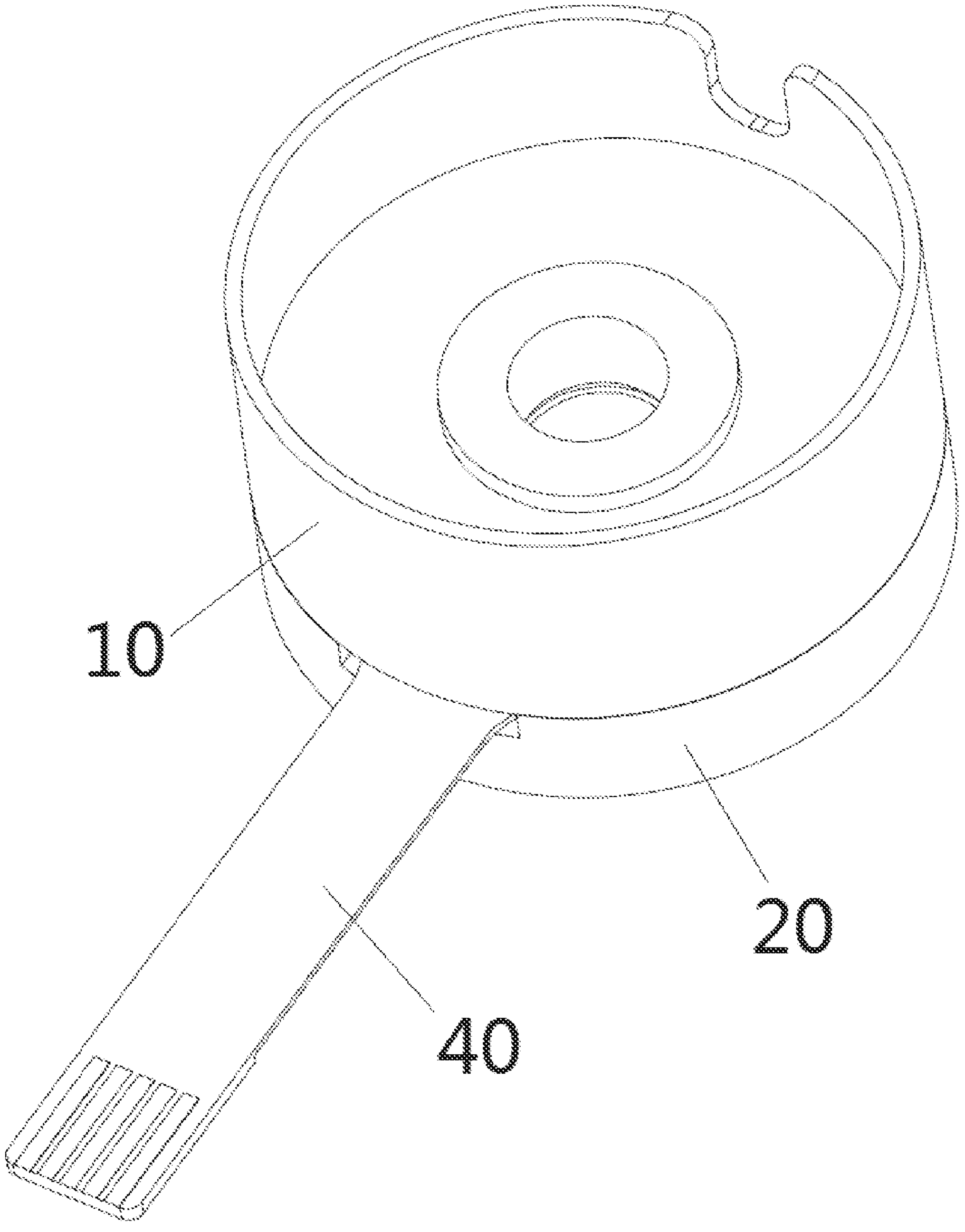
FIG. 1 is an illustrative perspective view of a force sensor according to an exemplary embodiment of the present invention.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

According to an embodiment of the present disclosure, a force sensor includes a force-sensitive elastomer, a thermal conductivity component adapted to transfer an external load to the force-sensitive elastomer, and a plurality of strain gauges attached to the force-sensitive elastomer. A circuit board of the sensor electrically connects the plurality of strain gauges into a detection circuit adapted to detect a strain of, or applied to, the force-sensitive elastomer. A peripheral part of the force-sensitive elastomer is in contact with the thermal conductivity component, and a remaining part of the force-sensitive elastomer (i.e., except for the peripheral part) is separated from the thermal conductivity component. The plurality of strain gauges are attached to or on the remaining part of the force-sensitive elastomer and do not contact the thermal conductivity component.

Figure 2:
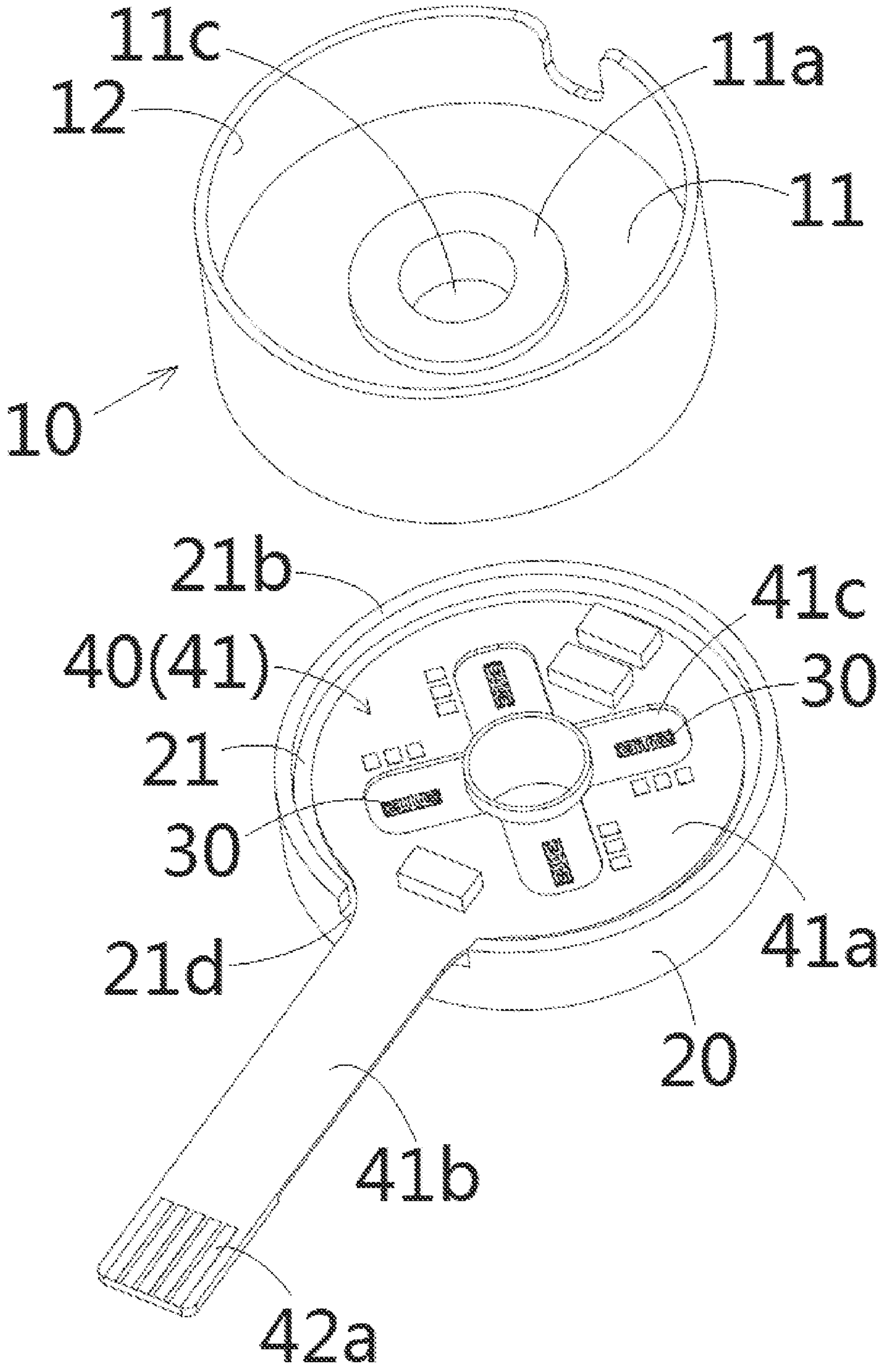
FIG. 2 is an illustrative exploded view of the force sensor according to an exemplary embodiment of the present invention.
Figure 3:
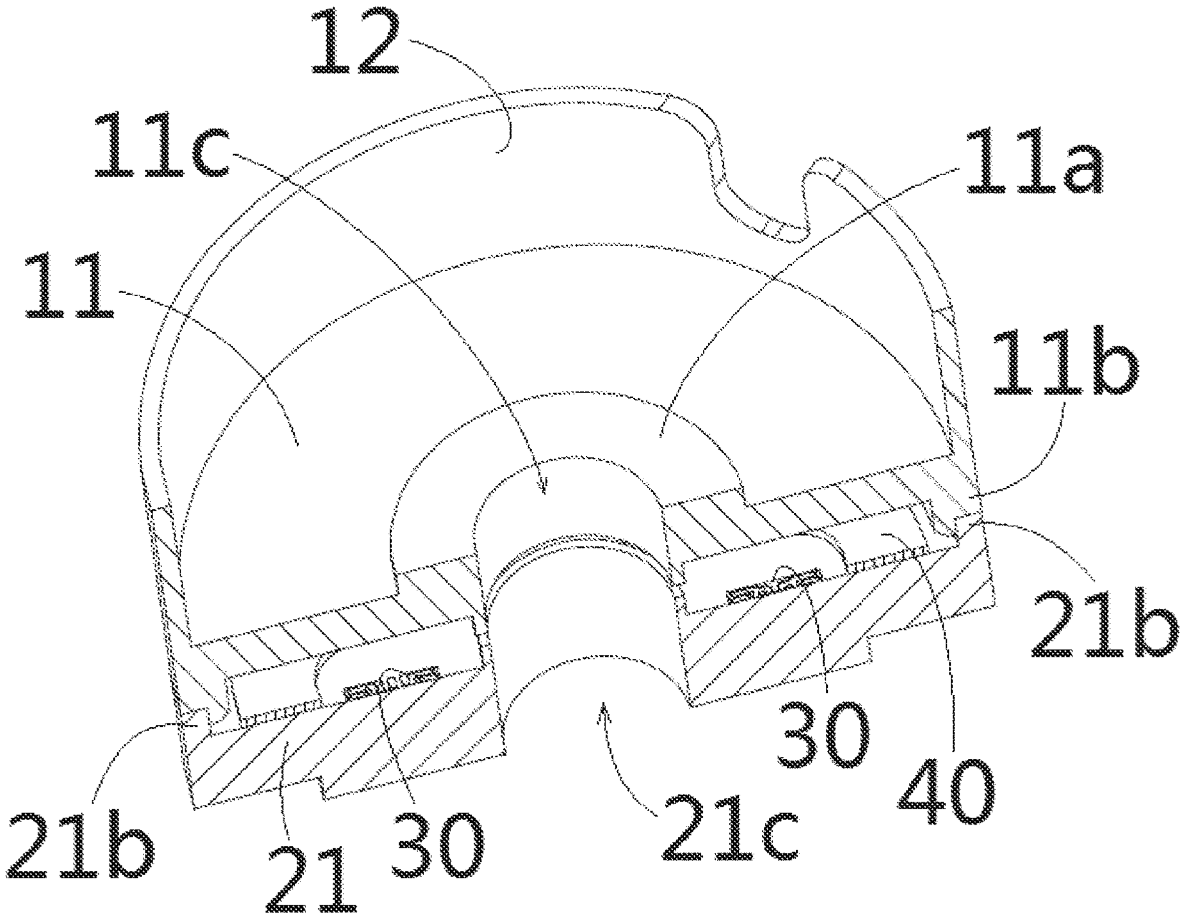
FIG. 3 is a cross-sectional view of a force sensor according to an exemplary embodiment of the present invention.
Figure 5:
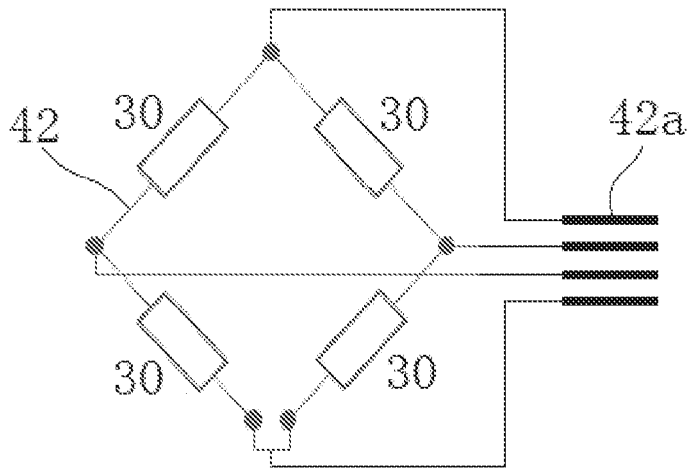
FIG. 5 is a schematic diagram of a detection circuit of a force sensor according to an exemplary embodiment of the present invention.

FIG. 1 is an illustrative perspective view of a force sensor according to an exemplary embodiment of the present disclosure. FIG. 2 is an illustrative exploded view of the force sensor according to an exemplary embodiment of the present disclosure. FIG. 3 is a cross-sectional view of a force sensor according to an exemplary embodiment of the present disclosure. FIG. 5 is a schematic diagram of a detection circuit of a force sensor according to an exemplary embodiment of the present disclosure.

As shown in FIGS. 1-3 and 5, in an exemplary embodiment, the force sensor includes a thermal conductivity component 10, a force-sensitive elastomer 20, a plurality of strain gauges 30, and a circuit board 40. The thermal conductivity component 10 is adapted to transfer an external load to the force-sensitive elastomer 20. The plurality of strain gauges 30 are mounted on the force-sensitive elastomer 20. The circuit board 40 is used to electrically connect a plurality of strain gauges 30 into a detection circuit (for example, the detection circuit shown in FIG. 5) adapted to detect a strain of the force-sensitive elastomer 20.

A peripheral part of the force-sensitive elastomer 20 is in contact with the thermal conductivity component 10, and the other part, or the remaining part, of the force-sensitive elastomer 20 except for the peripheral part is separated from the thermal conductivity component 10. The plurality of strain gauges 30 are attached on the remaining part of the force-sensitive elastomer 20 and are not in contact with the thermal conductivity component 10. As the remaining part of the force-sensitive elastomer 20 except for the peripheral parts is separated from the thermal conductivity component 10, an air gap can be used as the thermal insulation material to heat separate the remaining part of the force-sensitive elastomer 20 from the thermal conductivity component 10. In this way, the heat transferred to the thermal conductivity component 10 cannot be directly transferred to the remaining part of the force-sensitive elastomer 20. Rather, heat can only be transferred to the peripheral part of the force-sensitive elastomer 20 first, and then transferred from the peripheral part of the force-sensitive elastomer 20 to the remaining part of the force-sensitive elastomer 20. Therefore, embodiments of the present disclosure extend the heat conduction path from the thermal conductivity component 10 to the strain gauge 30, giving the heat a longer dissipation time and larger dissipation space. This results in a heat transfer to the multiple strain gauges 30 that is more uniform, thus eliminating or reducing any detection error caused by the temperature imbalance of the multiple strain gauges 30, and improving the detection accuracy of the force sensor.

In the exemplary embodiment, the force-sensitive elastomer 20 comprises a body part 21 and a flange part 21*b*. The flange part 21*b* is formed on the periphery of the body part 21 and protrudes toward the thermal conductivity component 10. The flange part 21*b* of the force-sensitive elastomer 20 is in contact with the thermal conductivity component 10. The body part 21 of the force-sensitive elastomer 20 is separated from the thermal conductivity component 10. In this way, the heat transferred to the thermal conductivity component 10 cannot be directly transferred to the body part 21 of the force-sensitive elastomer 20. The remaining part of the force-sensitive elastomer 20 except for the flange part 21*b* is separated from the thermal conductivity component 10, such that the heat transferred to the thermal conductivity component 10 cannot be directly transferred to the other part of the force-sensitive elastomer 20.

The body part 21 of the force-sensitive elastomer 20 forms a thin-walled diaphragm. A plurality of strain gauges 30 are attached on the surface of the body part 21 of the force-sensitive elastomer 20 facing the thermal conductivity component 10 and are not in contact with the thermal conductivity component 10. However, the present disclosure is not limited to the illustrated embodiment. For example, multiple strain gauges 30 can be attached to the surface of the body part 21 of the force-sensitive elastomer 20 opposite to the thermal conductivity component 10. The body part 21 of the force-sensitive elastomer 20 is in the shape of a circular plate, and the flange part 21*b* of the force-sensitive elastomer 20 is in the shape of a circular ring and perpendicular to the surface of the body part 21.

The circuit board 40 is attached to the surface of the body part 21 of the force-sensitive elastomer 20 facing the thermal conductivity component 10 and does not contact the thermal conductivity component 10. However, the present disclosure is not limited to the illustrated embodiment. For example, the circuit board 40 can be attached to the surface of the body part 21 of the force-sensitive elastomer 20 opposite to the thermal conductivity component 10.

The circuit board 40 and a plurality of strain gauges 30 are attached to the surface of the body part 21 of the force-sensitive elastomer 20 facing the thermal conductivity component 10. The circuit board 40 is formed with a plurality of slot holes 41*c* for avoiding the plurality of strain gauges 30 respectively to prevent the strain gauge 30 from contacting the circuit board 40. However, the present disclosure is not limited to the illustrated embodiments. For example, the circuit board 40 and the plurality of strain gauges 30 can be attached to the surface of the body part 21 of the force-sensitive elastomer 20 opposite to the thermal conductivity component 10.

The circuit board 40 includes a plate body 41 and conductive traces 42. The plate body 41 is attached to the body part 21 of the force-sensitive elastomer 20. The conductive traces 42 are formed on the plate body 41 and are used to electrically connect the plurality of strain gauges 30. The strain gauges 30 and the circuit board 40 can be electrically connected by wires, for example.

The plate body 41 of the circuit board 40 includes a first plate body part 41*a* and a second plate body part 41*b*. The first plate body part 41*a* is contained in a cavity surrounded by the body part 21 and the flange part 21*b* of the force-sensitive elastomer 20 and is attached to the body part 21 of the force-sensitive elastomer 20. The second plate body part 41*b* extends to the outside of the force-sensitive elastomer 20 for electrical connection with external devices (for example, an external power supply and an external signal acquisition device). A notch 21*d* is formed on the flange part 21*b* of the force-sensitive elastomer 20, and the second plate body part 41*b* extends to the outside of the force-sensitive elastomer 20 through the notch 21*d*.

The circuit board 40 also includes a plurality of external terminals 42*a* formed on the outer end of the second plate body part 41*b* for electrical connection with external devices. The aforementioned detection circuit can be a Wheatstone bridge including four strain gauges 30, and the aforementioned multiple external terminals 42*a* can include a power terminal, a ground terminal, a positive output terminal and a negative output terminal of the Wheatstone bridge.

In the illustrated embodiment, the circuit board 40 is a printed circuit board, and the conductive traces 42 and the plurality of external terminals 42*a* are formed on the board 41 by printing. The body part 21 of the force-sensitive elastomer 20 and the first plate body part 41*a* of the circuit board 40 are circular plates, and the second plate body part 41*b* of the circuit board 40 is in the shape of a tape.

The thermal conductivity component 10 is in a cap shape, and the thermal conductivity component 10 includes an end wall 11 and a peripheral wall 12. The end wall 11 of the thermal conductivity component 10 faces the body part 21 of the force-sensitive elastomer 20. The peripheral wall 12 of the thermal conductivity component 10 extends away from the force-sensitive elastomer 20. The flange part 21*b* of the force-sensitive elastomer 20 contacts with the peripheral portion of the end wall 11 of the thermal conductivity component 10. A contact flange 11*b* is formed on the periphery of the end wall 11 of the thermal conductivity component 10 facing the outer side of the force-sensitive elastomer 20. The contact flange 11*b* protrudes toward the force-sensitive elastomer 20 and contacts the end face of the flange part 21*b* of the force-sensitive elastomer. The other or remaining part of the thermal conductivity component 10 except for the contact flange 11*b* does not contact with the force-sensitive elastomer 20, so that heat can only be transferred from the contact flange 11*b* of the thermal conductivity component 10 to the force-sensitive elastomer 20.

Figure 4:
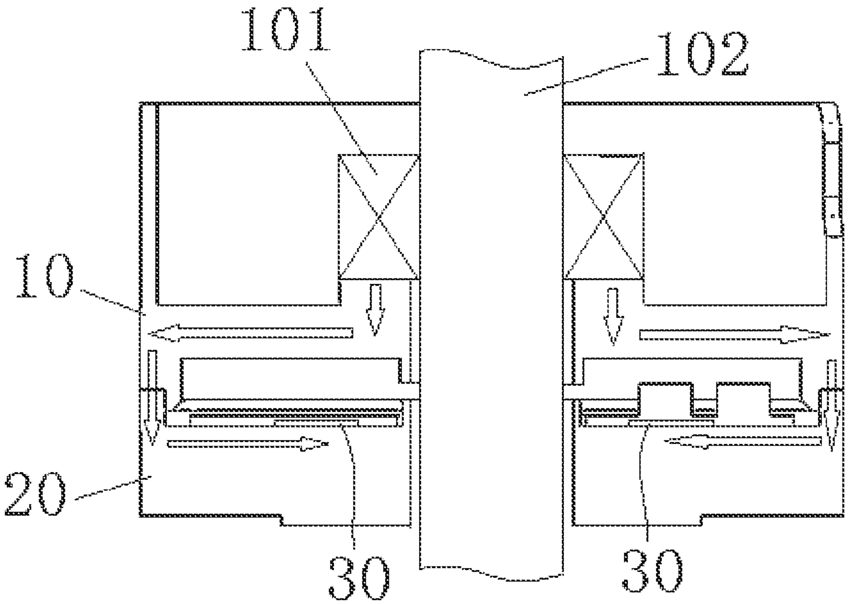
FIG. 4 is a cross-sectional view of a force sensor according to an exemplary embodiment of the present invention, showing a heat generating component and a force transfer rod.

FIG. 4 shows a sectional view of the force sensor according to an exemplary embodiment of the present invention, showing the heat generating component 101 and the force transmission rod 102. As shown in FIGS. 2-5, in the illustrated embodiment, the force sensor also includes a heat generating component 101. The heat generating component 101 is contained in an inner cavity surrounded by the end wall 11 and the peripheral wall 12 of the thermal conductivity component 10 and contacts the middle part of the inner side of the end wall of the thermal conductivity component. The middle part of the end wall 11 of the thermal conductivity component 10 is separated from the force-sensitive elastomer 20, so that heat cannot be directly transferred from the middle part of the thermal conductivity component to the force-sensitive elastomer.

The heat conduction path between the thermal conductivity component 10 and the strain gauge 30 is shown by the arrow in FIG. 4. In the illustrated embodiment, the heat is first transferred from the middle part of the thermal conductivity component 10 to the peripheral part of the thermal conductivity component, then from the peripheral part of the thermal conductivity component to the peripheral part of the force-sensitive elastomer 20, then from the peripheral part of the force-sensitive elastomer to the middle part of the force-sensitive elastomer, and finally from the middle part of the force-sensitive elastomer to the strain gauge 30. Therefore, embodiments of the present disclosure extend the heat conduction path from the thermal conductivity component 10 to the strain gauge 30, providing the heat a longer dissipation time and larger dissipation space, ensuring that the heat transferred to the multiple strain gauges 30 is more uniform, thus eliminating the detection error caused by the temperature imbalance of the multiple strain gauges 30, and improving the detection accuracy of the force sensor.

As shown in FIGS. 2 to 5, a convex part 11*a* for contacting with the heat generating component 101 is formed on the middle part of the inner side of the end wall 11 of the heat conducting element 10. The force sensor also includes a force transfer rod 102. The heat generating component 101 is installed on the force transfer rod 102. The heat generating component 101 may be a bearing suitable for rotating. When the bearing rotates, heat will be generated, and the generated heat will be transferred to the strain gauge 30 through the heat conduction path shown by the arrow in FIG. 4. The external load to be detected can be transferred to the thermal conductivity component 10 through the force transfer rod 102 and the heat generating component 101 and to the force-sensitive elastomer 20 through the thermal conductivity component.

Central through-holes 11*c*,21*c* that allow the force transfer rod 102 to pass through are respectively formed on the end wall 11 of the thermal conductivity component 10, the circuit board 40, and the body part 21 of the force-sensitive elastomer 20. A diameter of the central through-holes 11*c*, 21*c* is larger than the diameter of the force transfer rod 102, so that the force transfer rod does not contact the thermal conductivity component 10, the circuit board 40, and the force-sensitive elastomer 20, to prevent friction and heat generation between them.

Therefore, when the force transfer rod 102 rotates, there is no frictional heat generation between the force transfer rod and the thermal conductivity component 10, the circuit board 40, and the force-sensitive elastomer 20, thereby avoiding adverse effects on the strain gauge 30 caused by the frictional heat generation between them.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A force sensor, comprising:

a force-sensitive elastomer receiving an external load and having a strain detected to determine a force;

a thermal conductivity component adapted to transfer the external load to the force-sensitive elastomer, a peripheral part of the force-sensitive elastomer is in contact with the thermal conductivity component and a remaining part of the force-sensitive elastomer is separated from the thermal conductivity component;

a plurality of strain gauges attached to the force-sensitive elastomer; and a circuit board adapted to electrically connect the plurality of strain gauges to a detection circuit for detecting the strain applied to the force-sensitive elastomer, the plurality of strain gauges are attached on the remaining part of the force-sensitive elastomer and do not contact the thermal conductivity component.

2. The force sensor according to claim 1, wherein the force-sensitive elastomer includes:

a body part; and a flange part formed on the periphery of the body part and protruding towards the thermal conductivity component, the flange part of the force-sensitive elastomer is in contact with the thermal conductivity component, and the body part of the force-sensitive elastomer is separated from the thermal conductivity component.

3. The force sensor according to claim 2, wherein:

the plurality of strain gauges are attached on a surface of the body part of the force-sensitive elastomer facing the thermal conductivity component and are not in contact with the thermal conductivity component; or the plurality of strain gauges are attached on a surface of the body part of the force-sensitive elastomer opposite the thermal conductivity component.

4. The force sensor according to claim 3, wherein the body part of the force-sensitive elastomer is in a shape of a circular plate, and the flange part of the force-sensitive elastomer is circular and perpendicular to the surface of the body part.

5. The force sensor according to claim 3, wherein:

the circuit board is attached to a surface of the body part of the force-sensitive elastomer facing the thermal conductivity component and does not contact the thermal conductivity component; or the circuit board is attached to a surface of the body part of the force-sensitive elastomer opposite the thermal conductivity component.

6. The force sensor according to claim 5, wherein:

the circuit board and the plurality of strain gauges are attached on a surface of the body part of the force-sensitive elastomer facing the thermal conductivity component; and a plurality of slot holes are formed on the circuit board to prevent the strain gauges from contacting the circuit board.

7. The force sensor according to claim 5, wherein:

the circuit board and the plurality of strain gauges are attached on a surface of the body part of the force-sensitive elastomer opposite the thermal conductivity component; and a plurality of slot holes are formed on the circuit board to prevent the strain gauges from contacting the circuit board.

8. The force sensor according to claim 6, wherein the circuit board comprises:

a plate body attached to the body part of the force-sensitive elastomer; and conductive traces formed on the plate body and electrically connecting the plurality of strain gauges.

9. The force sensor according to claim 8, wherein the plate body of the circuit board includes:

a first plate body part contained in a cavity surrounded by the body part and the flange part of the force-sensitive elastomer and is attached to the body part of the force-sensitive elastomer; and a second plate body part extending to an outside of the force-sensitive elastomer and adapted to connect to an external device.

10. The force sensor according to claim 9, wherein a notch is formed on the flange part of the force-sensitive elastomer, and the second plate body part extends to the outside of the force-sensitive elastomer through the notch.

11. The force sensor according to claim 9, wherein the circuit board further includes a plurality of external terminals formed on an outer end of the second plate body part for electrically connecting with the external device.

12. The force sensor according to claim 11, wherein the detection circuit is a Wheatstone bridge, and the multiple external terminals include a power terminal, a ground terminal, a positive output terminal and a negative output terminal of the Wheatstone bridge.

13. The force sensor according to claim 11, wherein the circuit board is a printed circuit board, and the conductive traces and the plurality of external terminals are formed on the plate body by printing.

14. The force sensor according to claim 9, wherein the body part of the force-sensitive elastomer and the first plate body part of the circuit board are circular plates, and the second plate body part of the circuit board is in the shape of a tape.

15. The force sensor according to claim 2, wherein the thermal conductivity component is in a cap shape and includes:

an end wall facing the body part of the force-sensitive elastomer; and a peripheral wall extending away from the force-sensitive elastomer, the flange part of the force-sensitive elastomer contacts the peripheral part of the end wall of the thermal conductivity component.

16. The force sensor according to claim 15, wherein a contact flange is formed on the peripheral part of the end wall of the thermal conductivity component facing the outer side of the force-sensitive elastomer, the contact flange protrudes toward the force-sensitive elastomer and contacts an end face of the flange part of the force-sensitive elastomer, the thermal conductivity component is not in contact with the force-sensitive elastomer except for the contact flange.

17. The force sensor according to claim 15, further comprising:

a heat generating component contained in the inner cavity surrounded by the end wall and the peripheral wall of the thermal conductivity component and contacting a middle part of an inner side of the end wall of the thermal conductivity component, the middle part of the end wall of the thermal conductivity component is separated from the force-sensitive elastomer such that heat cannot be directly transferred from the middle part of the thermal conductivity component to the force-sensitive elastomer, and a convex part contacting with the heat generating component formed on the middle part of the inner side of the end wall of the thermal conductivity component.

18. The force sensor according to claim 17, further comprising a force transfer rod on which the heat generating component is installed, wherein the heat generating component is a rotatable bearing, the external load is transferred to the thermal conductivity component via the force transfer rod and the heat generating component and to the force-sensitive elastomer via the thermal conductivity component.

19. The force sensor according to claim 18, wherein a central through-hole is formed through the end wall of the thermal conductivity component, the circuit board and the body part of the force-sensitive elastomer and allowing the force transfer rod to pass therethrough, a diameter of the central through-hole is larger than a diameter of the force transfer rod such that the force transfer rod does not contact the thermal conductivity component, the circuit board and the force-sensitive elastomer.

20. A force sensor, comprising:

a force-sensitive elastomer including:

a body part; and a flange part formed on the periphery of the body part;

a thermal conductivity component adapted to transfer an external load to the force-sensitive elastomer, a peripheral part of the force-sensitive elastomer is in contact with the thermal conductivity component and a remaining part of the force-sensitive elastomer is separated from the thermal conductivity component, the flange part protruding towards the thermal conductivity component, the flange part of the force-sensitive elastomer is in contact with the thermal conductivity component, and the body part of the force-sensitive elastomer is separated from the thermal conductivity component;

a plurality of strain gauges attached to the force-sensitive elastomer, wherein:

the plurality of strain gauges are attached on a surface of the body part of the force-sensitive elastomer facing the thermal conductivity component and are not in contact with the thermal conductivity component; or the plurality of strain gauges are attached on a surface of the body part of the force-sensitive elastomer opposite the thermal conductivity component; and a circuit board adapted to electrically connect the plurality of strain gauges to a detection circuit for detecting a strain applied to the force-sensitive elastomer, the plurality of strain gauges are attached on the remaining part of the force-sensitive elastomer and do not contact the thermal conductivity component, wherein:

the circuit board is attached to a surface of the body part of the force-sensitive elastomer facing the thermal conductivity component and does not contact the thermal conductivity component; or the circuit board is attached to a surface of the body part of the force-sensitive elastomer opposite the thermal conductivity component; and/or the circuit board and the plurality of strain gauges are attached on a surface of the body part of the force-sensitive elastomer facing the thermal conductivity component and a plurality of slot holes are formed on the circuit board to prevent the strain gauges from contacting the circuit board;

the circuit board comprises:

a plate body attached to the body part of the force-sensitive elastomer, the plate body including:

a first plate body part contained in a cavity surrounded by the body part and the flange part of the force-sensitive elastomer and is attached to the body part of the force-sensitive elastomer; and a second plate body part extending to an outside of the force-sensitive elastomer and adapted to connect to an external device; and conductive traces formed on the plate body and electrically connecting the plurality of strain gauges.

21. A force sensor, comprising:

a force-sensitive elastomer including:

a body part; and a flange part formed on the periphery of the body part;

a thermal conductivity component adapted to transfer an external load to the force-sensitive elastomer, a peripheral part of the force-sensitive elastomer is in contact with the thermal conductivity component and a remaining part of the force-sensitive elastomer is separated from the thermal conductivity component, the flange part protruding towards the thermal conductivity component, the flange part of the force-sensitive elastomer is in contact with the thermal conductivity component, and the body part of the force-sensitive elastomer is separated from the thermal conductivity component, the thermal conductivity component is in a cap shape and includes:

an end wall facing the body part of the force-sensitive elastomer; and a peripheral wall extending away from the force-sensitive elastomer, the flange part of the force-sensitive elastomer contacts the peripheral part of the end wall of the thermal conductivity component;

a plurality of strain gauges attached to the force-sensitive elastomer;

a circuit board adapted to electrically connect the plurality of strain gauges to a detection circuit for detecting a strain applied to the force-sensitive elastomer, the plurality of strain gauges are attached on the remaining part of the force-sensitive elastomer and do not contact the thermal conductivity component;

a heat generating component contained in an inner cavity surrounded by the end wall and the peripheral wall of the thermal conductivity component and contacting a middle part of an inner side of the end wall of the thermal conductivity component, the middle part of the end wall of the thermal conductivity component is separated from the force-sensitive elastomer such that heat cannot be directly transferred from the middle part of the thermal conductivity component to the force-sensitive elastomer, a convex part contacting with the heat generating component formed on the middle part of the inner side of the end wall of the thermal conductivity component; and a force transfer rod on which the heat generating component is installed, wherein the heat generating component is a rotatable bearing, the external load is transferred to the thermal conductivity component via the force transfer rod and the heat generating component and to the force-sensitive elastomer via the thermal conductivity component.

* * * * *